United States Patent Office 3,495,426
Patented Feb. 17, 1970

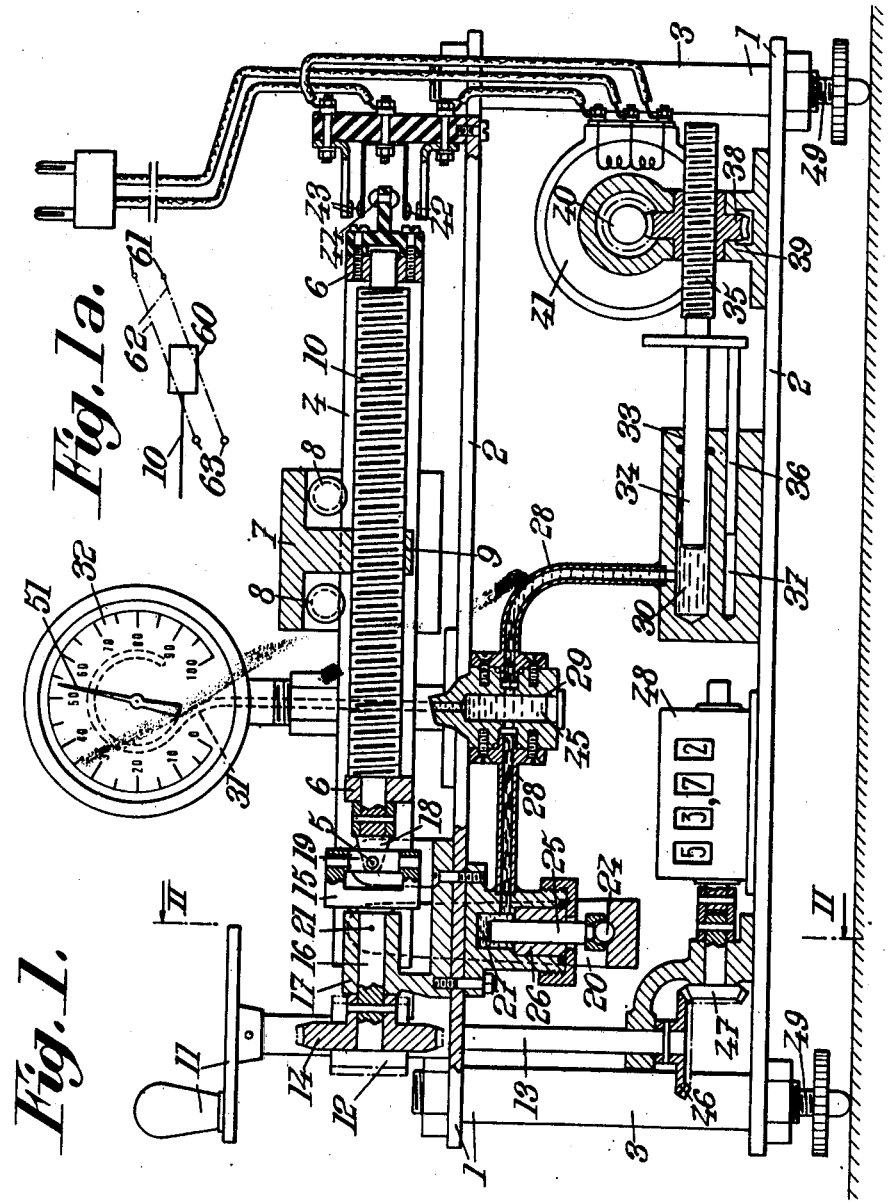

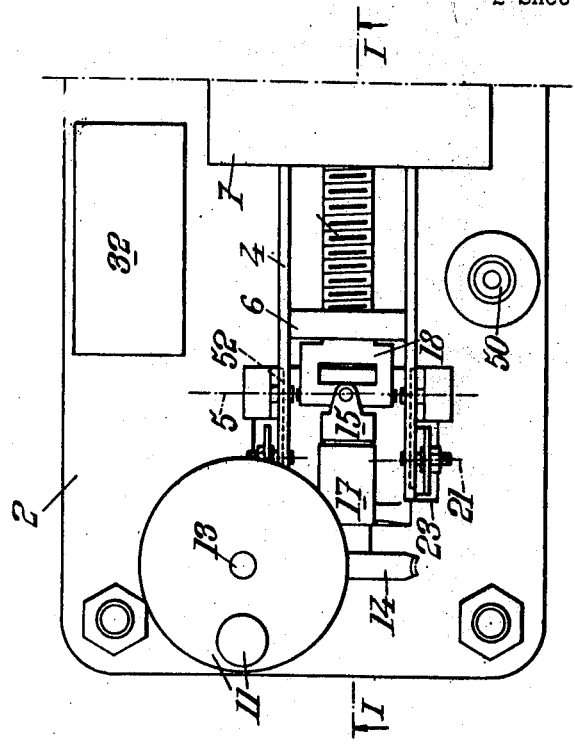
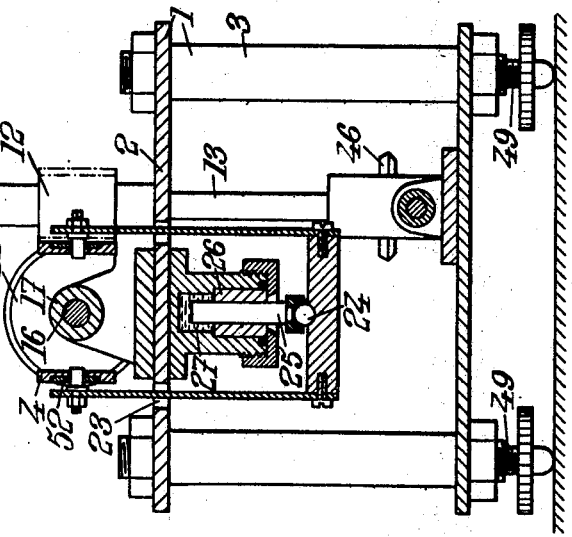

3,495,426
DEVICE FOR CALIBRATING MANOMETERS
André Huot, Villemomble, France, assignor to Societe Desgranges et Huot, Aubervilliers, France, a French society
Filed Feb. 27, 1968, Ser. No. 708,591
Claims priority, application France, Mar. 1, 1967, 97,037, Patent 1,520,700
Int. Cl. G01l 27/00; H01h 35/24
U.S. Cl. 73—4                                       4 Claims

ABSTRACT OF THE DISCLOSURE

The device comprises a beam pivotably mounted about a horizontal axis. The pressure of a liquid is applied both to one arm of this beam and to the manometer to be calibrated. A movable weight is mounted on the other arm, and numerical counter is provided for indicating the value of the liquid pressure corresponding to each position of the weight on this other arm during equilibrium of the beam. A reversible motor, switched on in one direction or the other by disequilibrium of the beam, automatically controls the liquid pressure in a sense which tends to reestablish equilibrium of the beam.

---

The present invention relates to devices for calibrating manometers, that is to say for graduating these manometers as a function of pressures applied on them or for verifying the exactness of indications given by these manometers as a function of these pressures. The invention is more particularly directed to calibration devices of this type for calibrating precision manometers, that is to say manometers that are capable of measuring pressures with a precision of the order of 1/1,000 or even better.

An object of the present invention is to provide calibration devices that respond well to the conditions of practice, in particular in that they assure the calibration in question in a precise, faithful and practically automatic manner. The value of the pressure really applied on the manometer to be calibrated is indicated automatically with precision on an indicator independent of this manometer (after stabilization of the movable members of the calibration device), and this pressure can be modified and adjusted over the entire extent of the range of service pressures of the manometer by simple angular displacements of a control wheel.

According to the present invention, a calibration device of the type in question comprises: a beam pivotably mounted about a fixed horizontal axis; means for generating an adjustable pressure in a liquid; means for transmitting the pressure of this liquid on the one hand to one arm of the beam and on the other hand to the manometer to be calibrated; a weight mounted on the other arm of this beam and displaceable along this other arm; means for indicating the value of the pressure of the liquid corresponding to each position of the weight on the beam during equilibrium of this beam; and means responsive to disequilibrium of the beam in a manner to control automatically the means for adjusting the pressure of the liquid in the sense which tends to reestablish equilibrium of this beam.

Apart from this principal feature, the present invention includes certain other features which are preferably used at the same time (but of which certain could, if appropriate, be used separately), and which will be more explicitely described hereafter.

In particular, according to a second feature—which relates more especially to calibration devices of the type in question in which the pressure of the liquid is transmitted to one of the arms of the beam by the intermediary of a free piston adapted to slide without play in a fixed cylinder having the same coefficient of thermal expansion as the free piston—the said one arm is made of a material having a negligible coefficient of thermal expansion and the other arm is made of a material having a coefficient of thermal expansion double the coefficient of thermal expansion of the material of which the piston and cylinder are made.

The present invention will be easily understood from the following particular description, with reference to the accompanying drawings, of a preferred embodiment, together with a modification of that embodiment, of a calibration device according to the present invention, this particular description and the drawings being given merely by way of example.

In the drawings, FIGURES 1, 2 and 3 show, respectively in vertical section along I—I of FIGURE 3, in vertical section along II—II of FIGURE 1, and in partial plan view, a manometer calibration device according to the present invention. FIGURE 1a shows very schematically a modification of FIGURE 1.

Before describing the drawings in detail, it is appropriate to recall that it has already been proposed to calibrate manometers by means of a balance having a manually controlled beam, the equilibrium of the beam being assured either by displacing, by hand, the weight along this beam, or by modifying, by manual rotation of a wheel, the pressure of a liquid applied on this beam and on the manometer to be calibrated at the same time.

Such a device is not very precise, and requires a long time to effect the calibration, since it only permits the calibration to be effected by successive approximations.

It has also been proposed to measure without interruption the pressure of a gas by means of a balance having a beam, in which balance, disequilibrium of the beam is automatically exploited to displace the weight on the beam in the sense tending to reestablish equilibrium.

For the calibration of high precision manometers, as in the present invention, which makes use of a liquid under pressure, such an automatic regulation, which acts solely on the position of the weight, cannot give satisfaction for it cannot compensate rigorously the errors due to leakage of the liquid along the pistons, due to the compressibility of this liquid, and due to he possible deformation of the tubing.

These indispensable compensations are obtained automatically by the present invention, according to which the regulation itself acts on the pressure of the liquid.

In the embodiment illustrated in FIGURES 1, 2 and 3, the calibration device comprises a fixed frame 1 formed, for example, essentially of two horizontal plates 2 spaced apart by columns 3, this frame 1 supporting a rigid beam 4 pivotably mounted about a horizontal axis 5 (FIGURES 1 and 3).

This beam 4 is formed of two parallel strips spaced apart by cross pieces 6.

One of the arms of the beam 4 (the right hand arm in FIGURES 1 and 3) carries a weight 7 mounted on rollers 8 rolling on the strips. This weight comprises a threaded bore 9 co-operating with a threaded rod 10 mounted in the cross pieces 6 and extending parallel to the strips.

Rotation of this rod—and hence displacement of the weight 7 along the beam 4—is controlled by rotation of a wheel 11 of vertical axis mounted on the frame, by the intermediary successively of a worm 12 rigid with the shaft 13 of this wheel 11, a tangent wheel 14 meshing with this worm, and a universal joint defined as follows: one of the elements 15 of this universal joint is rigid with the tangent wheel 14 by the intermediary of a shaft 16 rotatably mounted in a bearing 17 of horizontal axis, carried by the frame, its other element 18 is rigid with the threaded rod 10 and its cross-pin 19 has its centre on the axis 5 of pivoting of the beam.

The other arm of the beam (the left hand beam in FIGURES 1 and 3) carries a stirrup piece 20 suspended about an axis 21 of this beam and passing freely through windows 23 in the upper plate 2.

On the base of this stirrup piece bears, by the intermediary of a ball 24 (FIGURES 1 and 2), a piston 25 mounted in a manner to be able to slide freely and without play in a cylinder 26 of the frame.

The base of this piston, opposed to the ball, is situated in a chamber 27 communicating, by rigid conduits 28, with two other chambers 29 and 30 of the frame. The chamber 29 communicates itself with the chamber 31, sensitive to pressure, of the manometer 32 to be calibrated. The wall of the chamber 30 is perforated by a cylindrical bore 33 where a piston 34 is housed. The interior volume of the chambers 27, 29, 30 and 31 and of their connection conduits is filled with a liquid 45.

The piston 34 is extended at the exterior of the chamber 30 by a threaded rod 35 and is immobilized in rotation, but not in axial translation, by a parallel rod 36 rigidly connected to the threaded rod 35 and slidably mounted in a corresponding bore 37 of the frame.

The threaded rod 35 co-operates with a nut 38 immobilized in axial translation, but not in rotation, by its mounting in an appropriate bearing 39 of the frame. This nut is cut exteriorly as a tangent wheel and co-operates with a worm 40 mounted on the shaft of an electric motor 41.

This motor is adapted to be driven in rotation in one sense or in the other according to its type of actuation, that is to say according to whether its actuation is assured by the closing of one or the other of two electric switches 42 and 43.

In the embodiment illustrated in FIGURE 1, these switches are directly actuated by the end 44 of the larger arm of the beam 4. They are of course mounted in a manner such that the actuation of the motor assured by their closing has the effect of bringing the beam back into equilibrium (that is to say in general to its horizontal position), as will be explained later.

To each position of the weight 7 on the beam correspond at the same time on the one hand a well determined value of the pressure of the liquid 45 during equilibrium of the beam 4 and on the other hand a well determined angular position of the wheel 11 and its shaft 13.

For this reason the shaft 13 is connected, for example by the intermediary of a pair of trunconical gears 46 and 47, to the input of a numerical counter 48 which has been previously calibrated in a manner to indicate directly these well determined values of pressure corresponding to equilibrium of the beam for the various angular positions of the wheel 11: this preliminary calibration can easily be carried out by using a standard manometer as the manometer 32.

Also visible in the drawings are adjustable feet 49 and a bubble level 50 for assuring that the frame is horizontal.

The operation of the device described above is the following.

The pressure of the liquid 45 is reduced to a value equal to atmospheric pressure, and the manometer 32 to be calibrated is connected in circuit with this liquid, and then the feet 49 are adjusted to ensure that the frame is horizontal.

The wheel 11 is then turned until a given pressure is indicated on the counter 48, for example ten bars.

This operation displaces the weight 7 towards the right.

As the pressure of the liquid 45 is not sufficient to compensate the torque resulting from this displacement, the right hand arm of the beam 4 moves downwards, which closes the switch 42.

This closure actuates the motor 41 in the sense for which the piston 34 is driven towards the interior of the chamber 30, which increases the pressure of the liquid 45.

This increase of pressure drives the piston 25 and the stirrup piece 20 downwards, which moves the left hand arm of the beam 4 downwards.

When the equilibrium is again established, the switch 42 opens, the motor 40 stops, and the beam 4 becomes stationary.

One is then sure that the pressure applied to the manometer 32 is equal to the indicated pressure of ten bars, and consequently, the dial of this manometer can be graduated at the position occupied by its pointer 51 at this time.

The process is of course the same for all the other values of pressure.

Alternatively, by acting on the wheel 11 and waiting for the subsequent stabilization corresponding to equilibrium of the beam, one could make the pointer 51 indicate given values on the already graduated dial of a manometer 32, and then read the corresponding real values on the counter 48 in order to know the errors of this indication and possibly to establish a table of correction.

It should be noted that the value of the pressure of the liquid 45 for which equilibrium of the beam is established is always rigorously equal to the value then indicated on the counter 48: indeed, this pressure is the only variable quantity taking part in the torque exerted on the left hand arm of the beam (the cross section of the piston 25 and the length of the lever arm comprised between the axes 21 and 5 remaining constant), and variations of this indicated value are, due to the mounting envisaged, rigorously proportional to displacements of the weight 7 along the beam, which represent the only variable quantity taking part in the torque exerted on the right hand arm of the beam; this supposes, of courses, an initial calibration of the beam such that when the counter 48 indicates zero and consequently when the weight 7 occupies its extreme left hand position, the beam is in its horizontal position when the pressure prevailing in the chamber 27 has its zero value (value which corresponds to atmospheric pressure if the manometers 32 are graduated in relative values, or to an absolute vacuum if the manometers are graduated in absolute values).

In particular, the indicated value is not directly proportional to the degree of penetration of the piston 34 in the chamber 30 nor does it depend in any way on the quantity of liquid present in the chambers 27 to 31: the device thus assures a rigorous automatic compensation for leakage of liquid along the pistons, for the compressibility of this liquid and for possible deformation of the tubing.

In the embodiment illustrated in FIGURE 1, the switches 42 and 43 are formed by blade contacts actuated mechanically by the beam, but they couud of course be formed in any other desirable manner.

In particular, according to an advantageous modification, they could be conceived in a manner to be actuated by the beam without any mechanical contact with that beam.

Thus, they could be formed by relays actuated from the presence or absence of illumination on photoelectric cells by liminous beams masked at least in part by the beam according to its position.

One such modification is shown schematically in FIGURE 1a, in which the beam 10 carries an obturator 60. Two lamps 61 are provided directing parallel horizontal beams of light 62 respectively just above and just below the obturator 60. These beams 62 are directed respectively towards two photoelectric cells 63. When the beam 10 is in equilibrium, both light beams 62 fall on their respective photoelectric cells 63; when the beam 10 moves upwards the upper of the two beams 62 is blocked so that the light of this upper beam 62 does not fall on its corresponding photoelectric cell 63, and when the beam 10 moves downwards the lower of the two beams 62 is blocked so that the light of this lower beam 62 does not fall on its corresponding photoelectric cell 63. Switching means (not shown) are connected to the photoelectric cells 63 for actuating the motor 41 in the appropriate sense according to which of the beams 62 (upper or lower) is blocked by the disequilibrium of the beam 10.

Alternatively, displacement of the beam could acutate the desired contacts due to magnetic or inductive effects.

Similarly, the control of the sliding of the piston 34 could be assured by means other than electromechanical means, for example by hydraulic or pneumatic means.

Whatever embodiment is adopted, the present invention provides a calibration device whose construction, operation and advantages (precision, accuracy, simplicity of operation) result sufficiently from the foregoing.

Although the embodiments described above are satisfactory in many cases, it is preferable to use in addition the following feature of the invention, which feature can be used alone without departing from the scope of the invention, but which is especially advantageous in combination with the automatic mounting described above.

This feature relates to manometer calibration devices comprising a beam 4 of which one of the arms carries a movable weight 7 and of which the other arm receives the force exerted by a compressed liquid on a piston 25 of given cross section.

According to this feature, the arm of the beam that carries the weight 7 is made of a material whose coefficient of linear thermal expansion $K_1$ is double that $K_2$ of the material of which the piston 25 (and the cylinder 26 receiving this piston) is made, and the other arm of the beam is made of a material having a negligible coefficient of thermal expansion.

This feature renders the equilibrium of the beam independent of variations of the ambient temperature.

The torque exerted on the first arm of the beam depends on the temperature $t$ by a factor $1+K_1 t$, the mass of the weight 7 remaining constant.

As for the torque exerted on the other arm of the beam, it corresponds to the product of an invariable lever arm by a force proportional to the area of application of the pressure of the liquid on the piston 25. Now this force depends on the temperature by a factor $(1+K_2 t)^2$ whose value is approximately equal to $1+2K_2 t$, that is to say equal to $1+K_1 t$: accordingly the two torques in question depend on the temperature by the same factor and the consequences of thermal variations on the equilibrium of the beam are automatically compensated.

In the embodiment illustrated in FIGURES 1, 2 and 3, the first arm of the beam, that is to say the threaded rod 10, can be made of duralumin (whose coefficient $K_1$ is of the order of $23 \times 10^{-6}$), the second arm by two plates 52 (FIGURES 2 and 3) of Invar mounted in the strips 4, and the piston 25 and cylinder 26 of steel ($K_2$ of the order of $12 \times 10^{-6}$).

Various modifications to the embodiments shown in the drawings are of course possible, such as, for example, a modification in which the two arms of the beam, on which are respectively applied the force of the movable weight and the opposing force of the liquid under pressure, are disposed on the same side of the axis of pivoting of this beam, in which case the force due to the pressure of the liquid is oriented towards the top instead of towards the bottom.

The invention should not be limited to the various embodiments illustrated or described by way of example; on the contrary, many modifications (other than those mentioned in the description) could be made without departing from the spirit or scope of this invention.

What I claim is:
1. A device for calibrating manometers comprising:
a beam pivotably mounted about a horizontal fixed axis;
adjustable, pressure-generating means for generating an adjustable pressure in a liquid, comprising a movable piston in contact with said liquid;
means for transmitting the pressure of this liquid on the one hand to one arm of said beam, and on the other hand to the manometer to be calibrated;
a weight mounted on the other arm of said beam and displaceable along said other arm;
means for indicating the value of the pressure of the liquid corresponding to each position of said weight on said other arm during equilibrium of said beam; and
control means responsive to disequilibrium of said beam to adjust automatically said adjustable pressure-generating means in the sense which tends to reestablish equilibrium of said beam; and
wherein said control means comprise:
a reversible motor having a rotatable shaft;
a system for transforming rotation of the motor shaft into rectilinear displacement of said piston, the sense of this rectilinear displacement corresponding to the sense of rotation of said motor shaft;
and electric circuit adapted to energize said motor; and
electric switch means mounted on said circuit and adapted to be actuated by said beam to energize the motor, as long as said electric switch means are actuated, in the sense for which the beam returns towards its position of equilibrium.

2. A device according to claim 1 wherein said electric switch means are adapted to be actuated by said beam without any mechanical contact with said beam.

3. A device acording to claim 1, wherein the pressure of said liquid is transmitted to said one arm of said beam by the intermediary of a free piston slidable without play in a fixed cylinder having the same coefficient of thermal expansion as said free piston, and wherein said one arm is made of a material having a negligible coefficient of thermal expansion, and said other arm is made of a material having a coefficient of thermal expansion double the coefficient of thermal expansion of the free piston and fixed cylinder.

4. A device according to claim 3, wherein said free piston and fixed cylinder are made of steel, said one arm of said beam is made of Invar, and said other arm of said beam is made of aluminum alloy.

References Cited

UNITED STATES PATENTS

| 1,650,736 | 11/1927 | Zelov. |
| 2,725,741 | 12/1955 | Grant. |
| 2,992,302 | 7/1961 | Schuler. |
| 3,267,719 | 8/1966 | Wagner et al. |
| 3,407,644 | 10/1968 | Yasunami. |

LOUIS R. PRINCE, Primary Examiner

H. C. POST III, Assistant Examiner

U.S. Cl. X.R.

200—81